United States Patent
Dudebout et al.

(10) Patent No.: US 10,775,044 B2
(45) Date of Patent: Sep. 15, 2020

(54) GAS TURBINE ENGINE DUAL-WALL HOT SECTION STRUCTURE

(71) Applicant: HONEYWELL INTERNATIONAL INC., Morris Plains, NJ (US)

(72) Inventors: Rodolphe Dudebout, Phoenix, AZ (US); Atul Verma, Tucson, AZ (US); Sunil James, Chandler, AZ (US); Hamdullah Ozogul, Phoenix, AZ (US); John Gintert, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 138 days.

(21) Appl. No.: 16/172,383

(22) Filed: Oct. 26, 2018

(65) Prior Publication Data
US 2020/0132304 A1 Apr. 30, 2020

(51) Int. Cl.
*F23R 3/00* (2006.01)

(52) U.S. Cl.
CPC .......... *F23R 3/002* (2013.01); *F05D 2230/22* (2013.01); *F05D 2230/31* (2013.01); *F05D 2260/201* (2013.01); *F23R 2900/00018* (2013.01); *F23R 2900/03044* (2013.01)

(58) Field of Classification Search
CPC .... F23R 3/002; F23R 3/06; F23R 3/16; F23R 2900/03041; F23R 2900/03042; F23R 2900/03043; F23R 2900/03044
See application file for complete search history.

(56) References Cited

U.S. PATENT DOCUMENTS

| | | | |
|---|---|---|---|
| 5,353,865 A * | 10/1994 | Adiutori | F28F 13/02 165/109.1 |
| 8,794,961 B2 | 8/2014 | Chandler et al. | |
| 9,243,801 B2 | 1/2016 | Cunha et al. | |
| 2002/0124572 A1 | 9/2002 | Pidcock et al. | |
| 2006/0207259 A1* | 9/2006 | Holt | F23M 5/085 60/772 |
| 2010/0071382 A1* | 3/2010 | Liang | F01D 9/023 60/806 |
| 2011/0023495 A1 | 2/2011 | Bronson et al. | |

(Continued)

FOREIGN PATENT DOCUMENTS

| | | |
|---|---|---|
| EP | 2369235 A2 | 9/2011 |
| EP | 3211319 A1 | 8/2017 |

(Continued)

*Primary Examiner* — William H Rodriguez
(74) *Attorney, Agent, or Firm* — Lorenz & Kopf, LLP

(57) ABSTRACT

A hot section part of a turbine engine configured to be exposed to hot gases includes a first wall, a second wall, a plurality of pedestals, a plurality of impingement cooling holes, and a plurality of effusion cooling passages. The walls are spaced apart to form an intervening cavity, and each pedestal extends through the intervening cavity. The impingement cooling holes extend through the second wall to admit a flow of cooling air into the intervening cavity. Each effusion cooling passage is associated with a different one of the plurality of pedestals and is disposed at a predetermined angle relative to its associated principal axis. A portion of the flow of cooling air admitted to the intervening cavity is directed through at least a portion of each of the plurality of pedestals and onto the first wall inner surface.

20 Claims, 4 Drawing Sheets

(56) References Cited

U.S. PATENT DOCUMENTS

| | | | |
|---|---|---|---|
| 2011/0232299 A1* | 9/2011 | Stryapunin | F23R 3/04 60/806 |
| 2013/0047618 A1* | 2/2013 | Gregory | F23R 3/002 60/722 |
| 2014/0250894 A1 | 9/2014 | Petty, Sr. et al. | |
| 2014/0260282 A1 | 9/2014 | Pinnick et al. | |
| 2015/0013340 A1 | 1/2015 | Pinnick et al. | |
| 2016/0116166 A1* | 4/2016 | Drake | F23R 3/005 60/752 |
| 2016/0123592 A1* | 5/2016 | Drake | F23R 3/005 60/752 |
| 2016/0230993 A1 | 8/2016 | Dai et al. | |
| 2017/0176006 A1 | 6/2017 | Gerendas | |
| 2018/0051879 A1* | 2/2018 | Quach | F23R 3/002 |
| 2018/0238545 A1* | 8/2018 | Quach | F23R 3/60 |
| 2018/0238546 A1* | 8/2018 | Quach | F23R 3/002 |
| 2018/0335211 A1* | 11/2018 | Quach | F23R 3/002 |
| 2018/0335212 A1* | 11/2018 | Quach | F23R 3/002 |
| 2018/0363902 A1* | 12/2018 | Peters | F02C 7/18 |
| 2019/0242580 A1* | 8/2019 | Porter | F23R 3/002 |

FOREIGN PATENT DOCUMENTS

| | | |
|---|---|---|
| WO | 03062607 A1 | 7/2003 |
| WO | 2014197045 A2 | 12/2014 |
| WO | 2015050592 A2 | 4/2015 |

* cited by examiner

GAS TURBINE ENGINE DUAL-WALL HOT SECTION STRUCTURE

TECHNICAL FIELD

The present invention generally relates to gas turbine engines, and more particularly relates to dual-wall hot section structures within a gas turbine engine, such as a dual-wall combustor.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the inlet section of the engine and includes a fan that induces air from the surrounding environment into the engine and accelerates a portion of this air toward the compressor section. The remaining portion of air induced into the fan section is accelerated into and through a bypass plenum and out the exhaust section.

The compressor section raises the pressure of the air received from the fan section. The compressed air from the compressor section is then directed to the combustion section. In the combustion section, the compressed air enters the combustor, where a ring of fuel nozzles injects a steady stream of fuel. The fuel and air mixture is ignited in the combustor to form combustion gases from which energy is extracted in the turbine section.

To improve engine efficiencies, gas turbine engine designers and manufacturers continue to increase the operational temperatures within engines. At these ever-increasing temperatures, it becomes increasingly difficult to effectively cool the combustors and still maintain sufficient residual airflow for emissions and exit temperature (e.g., dilution) control. To address this difficulty, a dual-wall cooling approach (e.g., impingement and effusion) has been developed to reduce the combustor wall temperatures.

The dual-wall cooling approach uses conventional sheet metal construction with sliding joints and inserts to provide adequate jet velocity for major/quench holes. This approach has demonstrated promising reduction in wall temperatures, but also exhibits certain drawbacks. For example, it is susceptible to manufacturing tolerances, causing variation in cooling or pressure drop.

Hence, there is a need to provide a cooling approach for combustors and other dual-wall hot section structures that provides at least equivalent temperature reduction benefits as known dual-wall cooling approaches, while simultaneously reducing the susceptibility to manufacturing tolerances. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a hot section part of a turbine engine configured to be exposed to hot gases includes a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the hot gases. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

In another embodiment, a gas turbine engine combustor includes a first liner and a second liner spaced apart from the first liner to form a combustion chamber that is configured to receive an air-fuel mixture for combustion therein. At least one of the first and second liners comprises a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the air-fuel mixture. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

In yet another embodiment, a gas turbine engine includes a compressor section, a combustion section, and a turbine section disposed in flow series, the combustion section comprising a first liner and a second liner spaced apart from the first liner to form a combustion chamber that is configured to receive an air-fuel mixture for combustion therein. At least one of the first and second liners comprises a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the air-fuel mixture. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

Furthermore, other desirable features and characteristics of the dual-wall hot section parts will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, although embodiments are described herein in the context of a multi-spool gas turbine jet engine, it will be appreciated that various other end-use gas turbine engine configurations are contemplated. Some non-limiting examples of various other end-uses include turboshaft engines, jet engines, turboprop engines, and auxiliary power units. Moreover, the engine depicted and described herein may be used in other end-use environments beyond aircraft. Some non-limiting examples include spacecraft, watercraft, land vehicles, and ground-based power systems.

Figure 1:
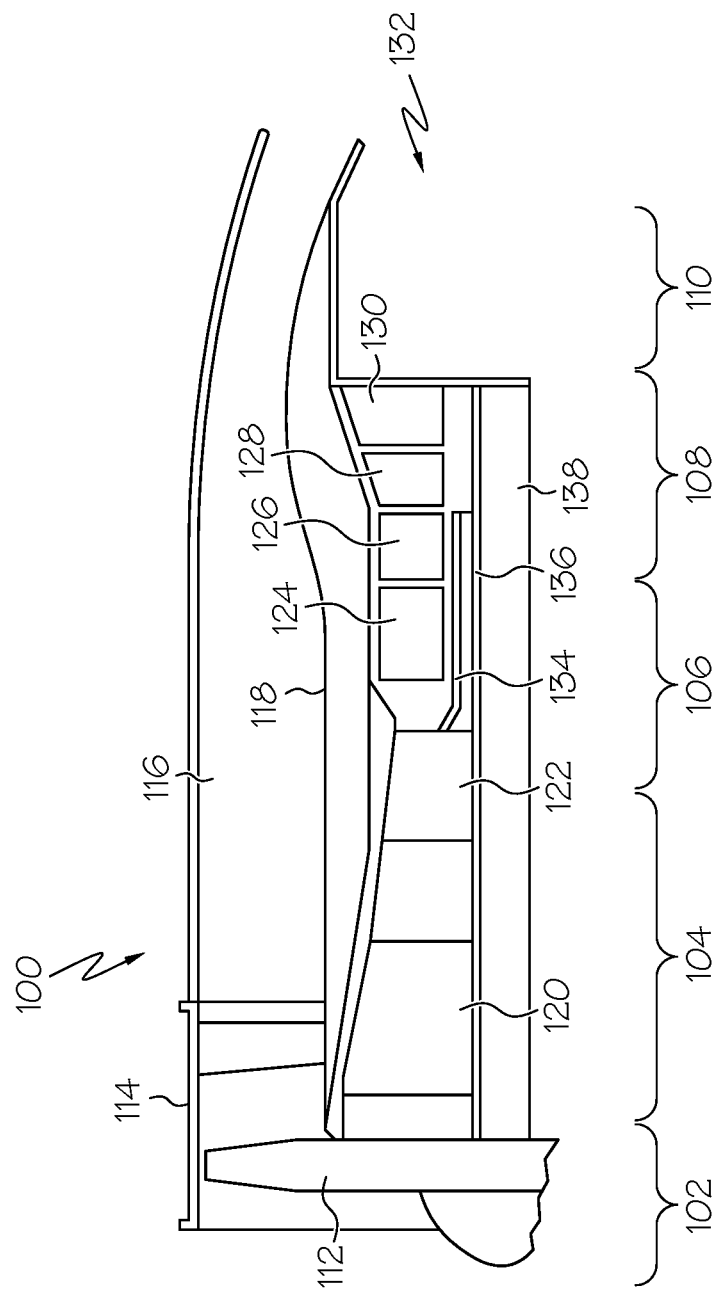
FIG. 1 is a simplified cross-sectional side view of an exemplary multi-spool turbofan gas turbine jet engine according to an exemplary embodiment.

Referring now to FIG. 1, exemplary embodiment of a multi-spool turbofan gas turbine jet engine 100 is depicted, and includes an intake section 102, a compressor section 104, a combustion section 106, a turbine section 108, and an exhaust section 110. The intake section 102 includes a fan 112, which is mounted in a fan case 114. The fan 112 draws in and accelerates air into the intake section 102. A fraction of the accelerated air exhausted from the fan 112 is directed through a bypass section 116 disposed between the fan case 114 and an engine cowl 118. The remaining fraction of air exhausted from the fan 112 is directed into the compressor section 104.

The compressor section 104 includes an intermediate-pressure compressor 120 and a high-pressure compressor 122. The intermediate-pressure compressor 120 raises the pressure of the air from the fan 112 and directs the compressed air into the high-pressure compressor 122. The high-pressure compressor 122 compresses the air further and directs the high-pressure air into the combustion section 106. In the combustion section 106, the high-pressure air is mixed with fuel and combusted in a combustor 124. The combusted air is then directed into the turbine section 108.

The turbine section 108 may have three turbines disposed in axial flow series, including a high-pressure turbine 126, an intermediate-pressure turbine 128, and a low-pressure turbine 130. The combusted air from the combustion section 106 expands through each turbine, causing it to rotate. The air is then exhausted through a propulsion nozzle 132 disposed in the exhaust section 110. As the turbines rotate, each drives equipment in the engine 100 via concentrically disposed shafts or spools. Specifically, the high-pressure turbine 126 drives the high-pressure compressor 122 via a high-pressure spool 134, the intermediate-pressure turbine 128 drives the intermediate-pressure compressor 120 via an intermediate-pressure spool 136, and the low-pressure turbine 130 drives the fan 112 via a low-pressure spool 138. The air is then exhausted through a propulsion nozzle 132 disposed in the exhaust section 110.

Figure 2:
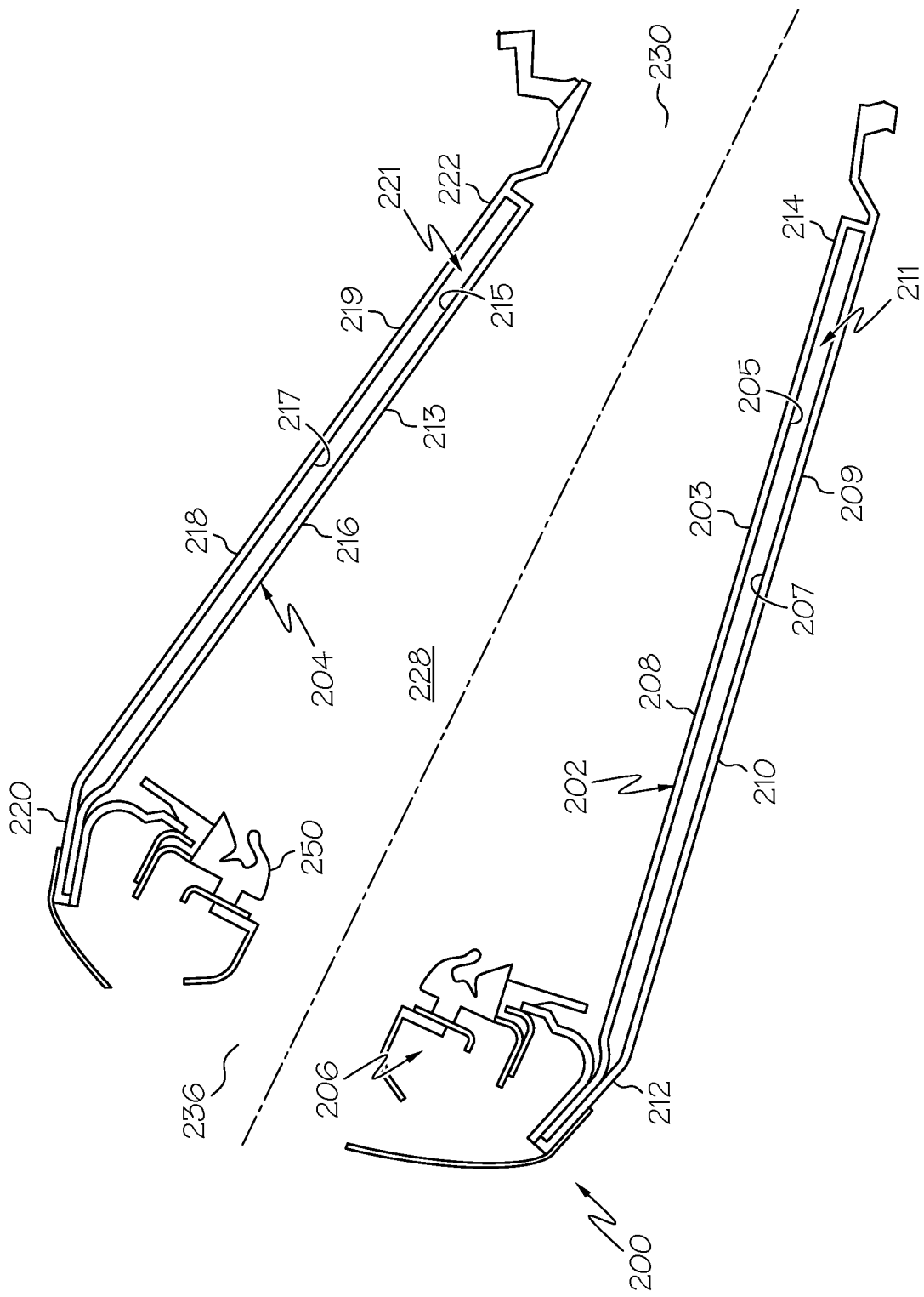
FIG. 2 is a simplified cross-sectional view of an exemplary combustor that may be used in the engine of FIG. 1.

Turning now to FIG. 2, a cross section view of one embodiment of a combustor 200 that may be used to implement the combustor 124 in the engine 100 of FIG. 1 is depicted. The combustor 200, at least in the depicted embodiment, is implemented as an annular combustor, and thus includes a first (or inner) liner 202, a second (or outer) liner 204, and a dome 206. The depicted inner liner 202 is a dual-wall liner that includes a first inner liner wall 208, a second inner liner wall 210, and upstream and downstream inner liner ends 212, 214. The first inner liner wall 208 includes an inner surface 203 and an opposing outer surface 205. The second inner liner wall 210 extends around at least a portion of the first inner liner wall 210 and also includes an inner surface 207 and an opposing outer surface 209. The second wall inner surface 207 is spaced apart from the first wall outer surface 205 to form a first intervening cavity 211.

The depicted outer liner 204, which at least partially surrounds the inner liner 202, is also a dual-wall liner that includes a first outer liner wall 216, a second outer liner wall 218, and upstream and downstream outer liner ends 220, 222. The first outer liner wall 218 includes an inner surface 213 and an opposing outer surface 215. The second outer liner wall 218 extends around at least a portion of the first inner liner wall 216 and also includes an inner surface 217 and an opposing outer surface 219. The second wall inner surface 217 is spaced apart from the first wall outer surface 215 to form a second first intervening cavity 221.

The dome 206 is coupled between the upstream ends 212, 220 of the inner and outer liners 202, 204 to form a combustion chamber 228 therebetween. The downstream ends 214, 222 of the inner and outer liners 202, 204 form an opening 230 through which combusted air flows into the turbine section 108 (FIG. 1). The dome 206 also includes a number of circumferentially spaced, axially facing swirler assembly openings 236. Each of the swirler assembly openings 236 is configured to have mounted therein a swirler assembly 250. The swirler assemblies mix fuel and air, and the air-fuel mixture is then discharged into the combustion chamber 228 where it is ignited by one or more igniters (not shown).

Before proceeding further, it should be noted that although the inner and outer liners 202, 204 in the depicted embodiment are both dual-wall liners, in other embodiments only one of the inner and outer liners 202, 204 could be dual-wall liners. It may be further appreciated that the inner surface 203 of the first inner liner wall 208, and the inner surface 213 of the first outer liner wall 216 are exposed to hot gases, such as the air-fuel mixture, during engine operation.

It is further noted that at least one of the inner and outer liners 202, 204, and preferably both of the liners 202, 204, further includes a plurality of pedestals, a plurality of impingement cooling holes, and a plurality of effusion cooling passages. For clarity and ease of illustration, these features are not depicted in FIG. 2. However, with reference to FIG. 3, the features will now be described in more detail. Before doing so, however, it is noted that although the structure depicted in FIG. 3 and is described in the context of a gas turbine engine combustor liner, the structure may be implemented as any one of numerous other hot section parts of a gas turbine engine (or non-gas-turbine-engine) that utilize impingement and/or effusion cooling. It is further noted that the phrase "effusion cooling passage" is equivalent to the term "angled cooling passage."

Figure 3:
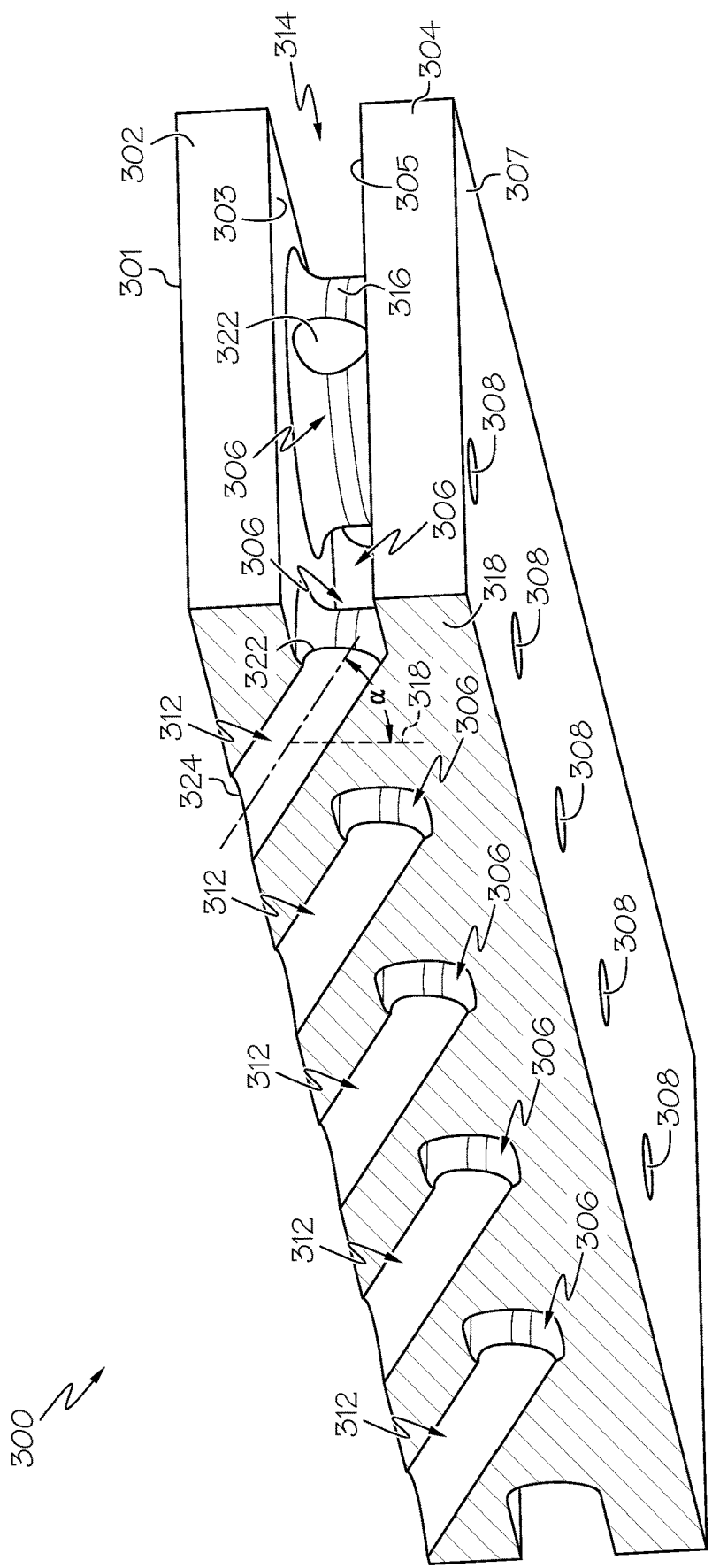
FIG. 3 is a cross-sectional view of a portion of a dual-wall hot section structure that may be implemented in the gas turbine engine of FIG. 1.

Turning now to FIG. 3, a cross sectional view of a portion of a dual-wall hot section part (or structure) 300, such as one of the inner or outer liners 202, 204 is depicted. The dual-wall hot section part 300 includes a first wall 302, a second wall 304, a plurality of pedestals 306, a plurality of impingement cooling holes 308, and a plurality of effusion cooling passages 312. The first wall 302 has a first wall inner surface 301 and an opposing first wall outer surface 303. When the structure 300 is installed in its end-use environment, such as an operating gas turbine engine, the first wall inner surface 301 is exposed to hot gases. The second wall 304 extends around at least a portion of the first wall 304 to form the dual-wall structure 300, and includes a second wall inner surface 305 and an opposing second wall outer surface 307. The second wall inner surface 305 is spaced apart from the first wall outer surface 303 to form an intervening cavity 314.

Figure 4:
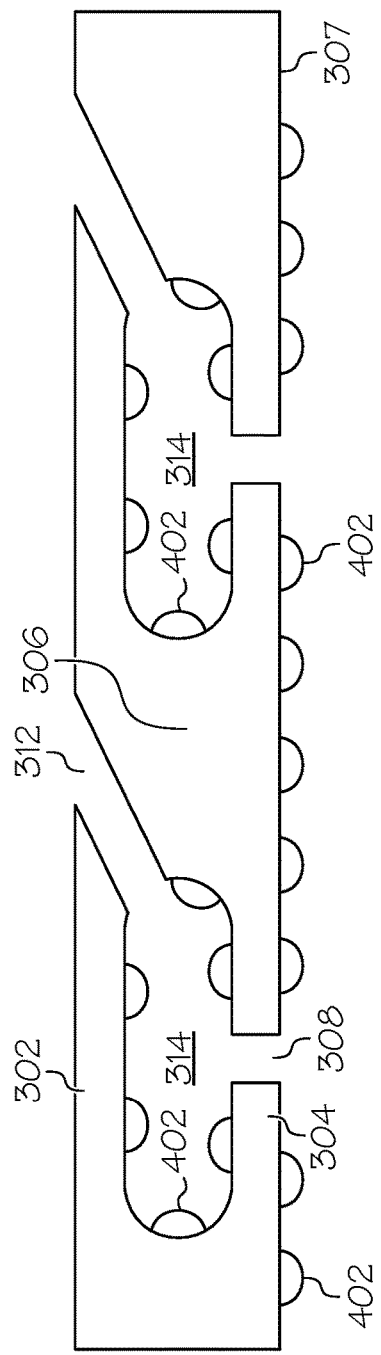
FIG. 4 is a cross-sectional view of a portion of another embodiment of a dual-wall hot section structure that may be implemented in the gas turbine engine of FIG. 1.

Before proceeding further, it is noted that in some embodiments, at least portions of the second wall outer surface 307 and/or the surfaces that define the intervening cavity 314 may include heat transfer enhancement features to provide better cooling effectiveness. One embodiment, which is depicted in FIG. 4, includes heat transfer enhancement features 402 on both the second wall outer surface 307 and the surfaces that define the intervening cavity 314, though the heat transfer enhancement features 402 could be on only one of these surfaces. The heat transfer features 402 may be implemented using turbulators, fins, bumps, or any one of numerous other features that trip the boundary layer and enhance cooling. In the embodiment depicted in FIG. 4, the heat transfer features 402 are semi-spherical bumps or small rounded cones.

Returning to FIG. 3, each of the pedestals 306 is coupled to the first wall outer surface 303 and the second wall inner surface 305 and extends through the intervening cavity 314. Each pedestal 306 is spaced apart from every other pedestal 306 of the plurality of pedestals and each has at least one outside surface 316 facing the intervening cavity 314. That is, the pedestals 306 do not share outer surfaces 316. Each pedestal 306 has a principal axis 318 and extends through the intervening cavity 314 about its principal axis 318. It will be appreciated that the pedestals 306 could be formed to have any one of numerous shapes. In the depicted embodiment, each pedestal 306, when taken along a cross section perpendicular to its principal axis 318, has a circular cross-sectional shape. In other embodiments, however, each pedestal 306, when taken along a cross section perpendicular to its principal axis 318, may have a non-circular cross-sectional shape, such as, for example, elliptical or any one of numerous polygonal shapes.

Figure 5:
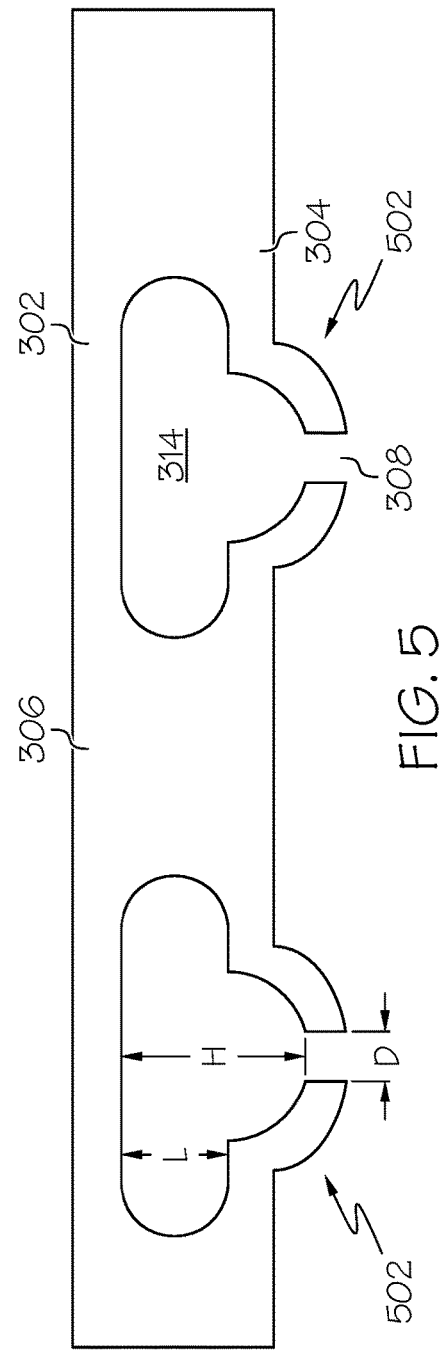
FIG. 5 is a cross-sectional view of a portion of another embodiment of a dual-wall hot section structure that may be implemented in the gas turbine engine of FIG. 1.

Each of the impingement cooling holes 308 extends through the second wall 304 to admit a flow of cooling air into the intervening cavity 314. In some embodiments, at least portions of the second wall 304 that surround some or all of the impingement cooling holes 308 are locally dimpled in a direction away from the intervening cavity 314. As depicted in FIG. 5, dimples 502, when included, increase the diameter diameter-to-impingement-height ratio (D/H) beyond the cavity height (L) in order to further improve the impingement cooling heat transfer.

Returning again to FIG. 3, each of the effusion cooling passages 312 is associated with a different one of the plurality of pedestals 306, and each has an inlet 322 and an outlet 324. The inlet 322 of each effusion cooling passage 312 is formed on at least one outside surfaces 316 of its associated pedestal 306, and the outlet 324 of each effusion cooling passage 312 is formed on the first wall outer surface 303. Each effusion cooling passage 306 is disposed at a predetermined angle ($\alpha$) relative to the principal axis 318 of its associated pedestal 306. The predetermined angle ($\alpha$) may vary, and may be in the range of 45-degrees to 80-degrees. Preferably, the principal axis 318 about 90-degrees (+/−20-degrees) from the wall surfaces.

Regardless of the specific value of the predetermined angle ($\alpha$), with the above-described configuration, a portion of the flow of cooling air admitted to the intervening cavity 314 is directed through at least a portion of each of the plurality of pedestals 306 and onto the first wall inner surface 301.

Although the first wall, the second wall, and the plurality of pedestals may be separately manufactured and joined together, in a particular preferred embodiment the dual-wall structure 300 (e.g., first wall, second wall, and pedestals) is an integral structure that is formed using an additive manufacturing process, such as direct metal laser sintering (DMLS). The dual-wall structure 300 also preferably comprises a nickel-based superalloy. Some non-limiting examples of nickel-based superalloys include HON-247 and HA-282, though any one of numerous other alloys may also be used, as needed or desired. In some embodiments, a bond coat and/or thermal barrier coating may be applied after the impingement cooling holes 308 and effusion cooling passages 312 are formed.

Unlike conventional dual-walled structures, the dual-wall structure 300 described herein combines impingement and effusion cooling into a single structure, using the pedestals 306 to connect cold and hot side walls. This also serves to conduct heat from the hot side wall and reduces thermal gradients, which alleviates out of plane stresses. The placement of the effusion cooling passages 312 in the pedestals 306 also provides minimal footprint to combine features in a light-weight package, potentially reducing weight relative to a conventional dual-wall structure.

In one embodiment, a hot section part of a turbine engine configured to be exposed to hot gases includes a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the hot gases. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

These aspects and other embodiments may include one or more of the following features. The predetermined angle may be in the range of 45-degrees to 80-degrees. Each pedestal, when taken along a cross section perpendicular to its principal axis, may have a circular cross-sectional shape. Each pedestal, when taken along a cross section perpendicular to its principal axis, may have a non-circular cross-sectional shape. Each pedestal may be spaced apart from every other pedestal of the plurality of pedestals. The hot section part may further include a plurality of heat transfer enhancement features formed on at least portions of one or more of the second wall outer surface and surfaces that define the intervening cavity. At least a portion of the second wall around the impingement cooling holes may be locally dimpled in a direction away from the intervening cavity. The first wall, the second wall, and the plurality of pedestals may comprise a nickel-based superalloy. The first wall, the second wall, and the plurality of pedestals may be integrally formed using one of an additive manufacturing process, an injection molding process, and a casting process. The additive manufacturing process may comprise direct metal laser sintering (DMLS).

In another embodiment, a gas turbine engine combustor includes a first liner and a second liner spaced apart from the first liner to form a combustion chamber that is configured to receive an air-fuel mixture for combustion therein. At least one of the first and second liners comprises a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the air-fuel mixture. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

These aspects and other embodiments may include one or more of the following features. The predetermined angle may be in the range of 45-degrees to 80-degrees. Each pedestal, when taken along a cross section perpendicular to its principal axis, may have a circular cross-sectional shape. Each pedestal, when taken along a cross section perpendicular to its principal axis, may have a non-circular cross-sectional shape. Each pedestal may be spaced apart from every other pedestal of the plurality of pedestals. The gas turbine engine combustor may further include a plurality of heat transfer enhancement features formed on at least portions of one or more of the second wall outer surface and surfaces that define the intervening cavity. At least a portion of the second wall around the impingement cooling holes may be locally dimpled in a direction away from the intervening cavity. The first wall, the second wall, and the plurality of pedestals may comprise a nickel-based superalloy. The first wall, the second wall, and the plurality of pedestals may be integrally formed using one of an additive manufacturing process, an injection molding process, and a casting process.

In yet another embodiment, a gas turbine engine includes a compressor section, a combustion section, and a turbine section disposed in flow series, the combustion section comprising a first liner and a second liner spaced apart from the first liner to form a combustion chamber that is configured to receive an air-fuel mixture for combustion therein. At least one of the first and second liners comprises a first wall, a second wall, a plurality of pedestals, a plurality of impingement cooling holes, and a plurality of effusion cooling passages. The first wall has a first wall inner surface and a first wall outer surface opposite the first wall inner surface. The first wall inner surface being exposed to the air-fuel mixture. The second wall extends around at least a portion of the first wall to form a dual-wall structure. The second wall has a second wall inner surface and a second wall outer surface opposite the second wall inner surface. The second wall inner surface is spaced apart from the first wall outer surface to form an intervening cavity. Each pedestal is coupled to the first wall outer surface and the second wall inner surface and extends through the intervening cavity. Each pedestal has at least one outside surface facing the intervening cavity, and each pedestal has a principal axis and extending through the intervening cavity about its principal axis. The impingement cooling holes extend through the second wall to admit a flow of cooling air into the intervening cavity. Each effusion cooling passage is associated with a different one of the plurality of pedestals and is disposed at a predetermined angle relative to its associated principal axis. Each effusion cooling passage has an inlet and an outlet. Each inlet is formed on a different one of the at least one outside surfaces, and each outlet is formed on the first wall outer surface, whereby a portion of the flow of cooling air admitted to the intervening cavity is directed through at least a portion of each of the plurality of pedestals and onto the first wall inner surface.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A hot section part of a turbine engine configured to be exposed to hot gases, the hot section part comprising:
    a first wall having a first wall inner surface and a first wall outer surface opposite the first wall inner surface, the first wall inner surface exposed to the hot gases;
    a second wall extending around at least a portion of the first wall to form a dual-wall structure, the second wall having a second wall inner surface and a second wall outer surface opposite the second wall inner surface, the second wall inner surface spaced apart from the first wall outer surface to form an intervening cavity;
    a plurality of pedestals, each pedestal coupled to the first wall outer surface and the second wall inner surface and extending through the intervening cavity, each pedestal having at least one outside surface facing the intervening cavity, and each pedestal having a principal axis and extending through the intervening cavity about its principal axis;
    a plurality of impingement cooling holes extending through the second wall to admit a flow of cooling air into the intervening cavity; and
    a plurality of effusion cooling passages, each effusion cooling passage associated with a different one of the plurality of pedestals and disposed at a predetermined angle relative to its associated principal axis, each effusion cooling passage having an inlet and an outlet, each inlet formed on a different one of the at least one outside surfaces, each outlet formed on the first wall outer surface, whereby a portion of the flow of cooling air admitted to the intervening cavity is directed through at least a portion of each of the plurality of pedestals and onto the first wall inner surface.

2. The hot section part of claim 1, wherein the predetermined angle is in the range of 45-degrees to 80-degrees.

3. The hot section part of claim 1, wherein each pedestal, when taken along a cross section perpendicular to its principal axis, has a circular cross-sectional shape.

4. The hot section part of claim 1, wherein each pedestal, when taken along a cross section perpendicular to its principal axis, has a non-circular cross-sectional shape.

5. The hot section part of claim 1, wherein each pedestal is spaced apart from every other pedestal of the plurality of pedestals.

6. The hot section part of claim 1, further comprising a plurality of heat transfer enhancement features formed on at least portions of one or more of the second wall outer surface and surfaces that define the intervening cavity.

7. The hot section part of claim 1, wherein at least a portion of the second wall around the impingement cooling holes are locally dimpled in a direction away from the intervening cavity.

8. The hot section part of claim 1, wherein the first wall, the second wall, and the plurality of pedestals comprise a nickel-based superalloy.

9. The hot section part of claim 1, wherein the first wall, the second wall, and the plurality of pedestals are integrally formed using one of an additive manufacturing process, an injection molding process, and a casting process.

10. The hot section part of claim 7, wherein the additive manufacturing process comprises direct metal laser sintering (DMLS).

11. A gas turbine engine combustor, comprising:
    a first liner; and
    a second liner spaced apart from the first liner to form a combustion chamber that is configured to receive an air-fuel mixture for combustion therein,
    wherein at least one of the first and second liners comprises:
        a first wall having a first wall inner surface and a first wall outer surface opposite the first wall inner surface, the first wall inner surface exposed to the air-fuel mixture;

a second wall extending around at least a portion of the first wall to form a dual-wall structure, the second wall having a second wall inner surface and a second wall outer surface opposite the second wall inner surface, the second wall inner surface spaced apart from the first wall outer surface to form an intervening cavity;

a plurality of pedestals, each pedestal coupled to the first wall outer surface and the second wall inner surface and extending through the intervening cavity, each pedestal having at least one outside surface facing the intervening cavity, and each pedestal having a principal axis and extends through the intervening cavity about its principal axis;

a plurality of impingement cooling holes extending through the second wall to admit a flow of cooling air into the intervening cavity; and a plurality of effusion cooling passages, each effusion cooling passage associated with a different one of the plurality of pedestals and disposed at a predetermined angle relative to its associated principal axis, each effusion cooling passage having an inlet and an outlet, each inlet formed on a different one of the at least one outside surfaces, each outlet formed on the first wall outer surface, whereby a portion of the flow of cooling air admitted to the intervening cavity is directed through at least a portion of each of the plurality of pedestals and onto the first wall inner surface.

12. The gas turbine engine combustor of claim 11, wherein the predetermined angle is in the range of 45-degrees to 80-degrees.

13. The gas turbine engine combustor of claim 11, wherein each pedestal, when taken along a cross section perpendicular to its principal axis, has a circular cross-sectional shape.

14. The gas turbine engine combustor of claim 11, wherein each pedestal, when taken along a cross section perpendicular to its principal axis, has a non-circular cross-sectional shape.

15. The gas turbine engine combustor of claim 11, wherein each pedestal is spaced apart from every other pedestal of the plurality of pedestals.

16. The gas turbine engine combustor of claim 11, further comprising a plurality of heat transfer enhancement features formed on at least portions of one or more of the second wall outer surface and surfaces that define the intervening cavity.

17. The gas turbine engine combustor of claim 11, wherein at least a portion of the second wall around the impingement cooling holes are locally dimpled in a direction away from the intervening cavity.

18. The gas turbine engine combustor of claim 11, wherein the first wall, the second wall, and the plurality of pedestals comprise a nickel-based superalloy.

19. The gas turbine engine combustor of claim 11, wherein the first wall, the second wall, and the plurality of pedestals are integrally formed using one of an additive manufacturing process, an injection molding process, and a casting process.

20. A gas turbine engine, comprising:

a compressor section, a combustion section, and a turbine section disposed in flow series, the combustion section comprising a first liner and a second liner spaced apart from the first liner to form a combustion chamber that is configured to receive an air-fuel mixture for combustion therein, wherein at least one of the first and second liners comprises:

a first wall having a first wall inner surface and a first wall outer surface opposite the first wall inner surface, the first wall inner surface exposed to the air-fuel mixture;

a second wall extending around at least a portion of the first wall to form a dual-wall structure, the second wall having a second wall inner surface and a second wall outer surface opposite the second wall inner surface, the second wall inner surface spaced apart from the first wall outer surface to form an intervening cavity;

a plurality of pedestals, each pedestal coupled to the first wall outer surface and the second wall inner surface and extending through the intervening cavity, each pedestal having at least one outside surface facing the intervening cavity, and each pedestal having a principal axis and extending through the intervening cavity about its principal axis;

a plurality of impingement cooling holes extending through the second wall to admit a flow of cooling air into the intervening cavity; and a plurality of effusion cooling passages, each effusion cooling passage associated with a different one of the plurality of pedestals and disposed at a predetermined angle relative to its associated principal axis, each effusion cooling passage having an inlet and an outlet, each inlet formed on a different one of the at least one outside surfaces, each outlet formed on the first wall outer surface, whereby a portion of the flow of cooling air admitted to the intervening cavity is directed through at least a portion of each of the plurality of pedestals and onto the first wall inner surface.

* * * * *